United States Patent [19]

Young

[11] 3,844,977
[45] Oct. 29, 1974

[54] ALUMINOSILICATE COMPOSITIONS, METHOD OF PREPARATION

[75] Inventor: Dean Arthur Young, Yorba Linda, Calif.

[73] Assignee: Union Oil Company of California, Los Angeles, Calif.

[22] Filed: Nov. 15, 1972

[21] Appl. No.: 306,860

[52] U.S. Cl. .............................. 252/438, 252/455 Z
[51] Int. Cl. ......................... B01j 11/82, B01j 11/40
[58] Field of Search ........... 252/455 Z, 438, 455 R; 55/75

[56] References Cited
UNITED STATES PATENTS

| | | | |
|---|---|---|---|
| 3,313,594 | 4/1967 | Wilson, Jr. | 252/455 Z |
| 3,600,455 | 8/1971 | Dean | 252/438 X |

Primary Examiner—C. Dees
Attorney, Agent, or Firm—Richard C. Hartman; Lannas S. Henderson; Michael H. Laird

[57] ABSTRACT

Intimate dispersions of particulate aluminosilicates and refractory oxides are prepared in aqueous media in the presence of an oxygen containing amine followed by separation and drying of the resultant dispersion. The original aluminosilicate or refractory oxide can contain active components, stabilizing compositions and the like, as such or in a form that can be subsequently converted to such active components by thermal or chemical treatment. Similarly the dispersion of the aluminosilicate in the refractory oxide can be combined with catalytically active, stabilizing or otherwise chemically or physically modifying compositions.

13 Claims, No Drawings

ALUMINOSILICATE COMPOSITIONS, METHOD OF PREPARATION

The chemical and physical properties of aluminosilicates have led to their use in diverse applications. The physical properties of these materials must be sufficient to withstand the thermal or physical stresses imposed during use. Physical degradation is most pronounced and has been most widely investigated in the area of fluid-solids systems. Probably the most severe environment to which aluminosilicates are exposed is fluid catalytic cracking in which the solid catalyst is continuously cycled through hydrocarbon conversion and catalyst regeneration zones which usually results in attrition and catalyst loss. Furthermore, it is usually desirable to preserve the catalyst or adsorbent in a predetermined physical form. This is true in adsorption systems such as liquid-liquid separation, liquid-gas separation, etc., as well as in fixed-bed and heterogeneous disperse phase systems where particulate catalyst is dispersed in a liquid reactant phase. Exemplary of such conversion systems are hydrocracking, hydrofining, isomerization, alkylation, hydrogenation, dehydrogenation, polymerization, oxidation, and the like.

Many of the problems associated with physical instability have been solved by combining the aluminosilicate into solid particles with cementing agents or binders. These binders often comprise refractory oxides such as silica, alumina, magnesia, zirconia and the siliceous clays and micas such as diatomite, bentonite, halloysite and montmorillonite. The aforementioned problems are particularly apparent with combinations of crystalline aluminosilicates having $SiO_2/Al_2O_3$ mole ratios above 2 and siliceous amorphous refractory oxides. Thus, the advantages of this invention are particularly useful when dealing with refractory oxides containing at least about 20, and particularly those containing at least about 50 weight percent silica.

The physical stability and effectiveness of these composites are often influenced by relatively homogeneity, i.e., evenness of dispersion of the several components. Conventional procedures for combining particulate aluminosilicates with refractory oxides are not effective for producing the best dispersion of the two or more constitutents involved. In many instances these methods induce agglomeration of one or more of these constituents, particularly the aluminosilicate. The result is a composite containing agglomerates of the aluminosilicate particles which themselves are not cemented together with the same rigidity that would be possible where they intermingled with the refractory oxide. In some instances agglomeration also limits the accessibility of reactants and/or absorbates to the aluminosilicate particles located in the agglomerate interior.

The properties of these homogeneous combinations are also beneficial for the so-called dual function catalysts. Many processes and reactions employed catalysts having distinct sites of different nature. For example, a single composition might contain two or more different kinds of sites exhibiting acidic, basic or hydrogenation functions. Furthermore, the activity and selectivity of these catalysts may depend both on the number of each kind of active site and the location of those sites relative to each other as well as to other active centers. The problem of obtaining the most effective distribution of two or more types of active centers is complicated by the fact that procedures required to optimize the characteristics of one type of site may not be compatible with or promote the formation of the second or third types of active centers. Thus it becomes necessary to separately produce the several kinds of active centers desired and then blend the resulting compositions. P. B. Weisz, *Advances in Catalysis*, Volume 13, 137 (1962), has described the preparation of dual site catalysts from mixtures and has shown the necessity for obtaining different degrees of mixing. These studies indicate that heterogeneity, even on a very localized scale can influence catalyst characteristics.

It is therefore one object of this invention to provide an improved method for preparing composites of aluminosilicates and refractory oxides. It is another object to provide an improved aluminosilicate-refractory oxide composite and the method for preparing the same. Yet another object is the provision of improved aluminosilicate adsorbents and catalysts and methods of preparing the same. Yet another object is the provision of a method for producing hydrocarbon conversion catalysts. A further object is the provision of improved hydrocarbon conversion catalysts.

In accordance with one embodiment of this invention improved composites of aluminosilicates and refractory oxides are prepared by mixing particulate solid aluminosilicates and the refractory oxide in an aqueous medium with a deflocculating amount of at least one water soluble oxygen-containing amine. In accordance with another embodiment, composites of aluminosilicates and refractory oxides are prepared by dispersing a particulate aluminosilicate with a deflocculating amount of an oxygen-containing amine, and adding a particulate refractory oxide.

The latter of these two embodiments is presently preferred since the refractory oxides promote agglomeration of the aluminosilicate particles in the absence of the oxygen-containing amine. Obviously, an intimate dispersion can be obtained more easily by preventing any agglomeration at the outset. Nevertheless, I have also found that agglomerates of aluminosilicate particles can be dispersed by thorough agitation in the presence of the amine dispersants.

A wide variety of natural and synthetic crystalline and amorphous aluminosilicates can be used. Obviously, the specific characteristics of the particulate aluminosilicate must be chosen with regard to the function which it is to perform. For example, several zeolites are presently preferred for certain hydrocarbon conversion reactions. These include the faujasite-type zeolites X and Y. Illustrative of other zeolites are Zeolite A, U.S. Pat. No. 2,882,243; Zeolite L, Belgium Pat. No. 575,117; Zeolite D, Canada Pat. No. 661,981; Zeolite T, U.S. Pat. No. 2,950,952; Zeolite KG, U.S. Pat. No. 3,056,654, the so-called layered aluminosilicates and chemically modified or thermally stabilized forms thereof. Exemplary of the naturally occurring crystalline aluminosilicates are levynite, dachiardite, erionite, faujasite, phillipsite, flakite, datolite, chabazite, mordenite, and sodalite.

Zeolite particle size can vary considerably. However, agglomeration is usually more pronounced with smaller particles. Accordingly, the advantages of this process are more apparent in composites prepared from relatively fine particles.

As a general rule the weight average particle size will be below about 100 microns, preferably within the range of about 0.1 to about 10 microns. Any given sample of particles will of course include particles of greatly varying diameters — the degree of such variation depending in large part on the manner in which the particles were prepared. Aluminosilicates are generally prepared in the form of solid gels which are crushed and granulated subsequent to formation by any available means of reducing particle size, one of the most prominent of which is ball milling.

The refractory oxide can be combined with the aluminosilicate in essentially any form including dehydrated or hydrated gels or sols or treated or untreated naturally occurring refractory oxides such as the siliceous clays and micas. Alternatively, the refractory oxide can be formed in the presence of the aluminosilicate by any one of numerous well known procedures. For example, the aluminosilicate can be dispersed in a solution of sodium aluminate or sodium silicate or other gel precursors followed by precipitation of a sol or gel by the addition of acid or base by conventional methods. However, the oxide is preferably added as a hydrous gel or sol containing at least 20 and preferably at least about 50 weight percent water. In contrast, the aluminosilicates are usually relatively anhydrous. They will generally contain less than 40 and often less than 20 weight percent physisorbed water prior to combination with the refractory oxide.

When the refractory oxide is added as a preformed gel or sol it should preferably have a relatively small particle size corresponding to a weight average particle size below about 10 microns, preferably below about 5 microns. The oxide will usually account for at least about 10 weight percent, preferably at least about 20 weight percent of the combination of aluminosilicate and oxide on a dry weight basis. Conversely, the aluminosilicate usually constitutes at least about 2, and preferably at least 5 weight percent of the mixture.

The oxygen-containing amines are selected from straight or branched-chain or cyclic, saturated or unsaturated, aliphatic or aromatic oxygen-containing mono- and polyamines having a substantial degree of solubility in water. The preferred amines are the alkoxy, alkenoxy, hydroxy, alkyl and alkenyl amines, pyridines, piperidines, and the alkyl, alkenyl, alkoxy, alkenoxy and hydroxy substituted and unsubstituted oxazines and morpholines having from about 2 to about 12 carbon atoms per molecule. For the purposes of this invention these compounds must contain at least one oxygen atom and at least one nitrogen atom, preferably separated by at least two carbon atoms. However, they may contain a plurality of either or both of the nitrogen and oxygen substituents, although the presently preferred amines generally have from 1 to about 4 oxygen atoms and from 1 to about 3 primary, secondary or tertiary amino groups. Exemplary of this class of amines are mono-, di-, and tri- ethanolamines, pentanolamine, 2-hydroxy-4-ethoxypyridine, 2,4-dipropoxypiperadine, 2,5-diethyloxazine, and the like.

The smallest quantity of the amine required to inhibit agglomeration of the aluminosilicate particles will vary depending upon the characteristics of the aluminosilicate, the composition and concentration of the refractory oxide and the activity of the selected amine. However, the concentrations required can be readily determined for any given system by mixing predetermined amounts of the selected aluminosilicate, refractory oxide and amine and decanting or centrifuging the resultant suspension. The presence of agglomerates will be readily apparent by visual inspection due to the relatively more rapid settling rate of agglomerated particles. If agglomeration is observed, additional amine can be added until a homogeneous particulate dispersion can be maintained. As a general rule, however, the concentration of the amine should be at least about 0.1, preferably about 0.5 to about 20 weight percent based on the solids dry weight.

The dispersed solids can be separated from the resulting aqueous phase by any one of numerous means such as filtration, centrifuging, decanting, drying, spray drying, and the like. For purposes of economy, the water content of the aqueous dispersions should not be much more than that required to obtain adequate dispersion. As a general rule water content will usually exceed about 50 weight percent based on the combined weight of the aluminosilicate, refractory oxide and water, and is preferably between about 50 to about 95 weight percent. The separated composite can then be dried and formed by extrusion, pelleting, roasting, or the like.

These compositions can be used directly as catalysts, such as in catalytic cracking, or can be combined with other components such as rare earth metal cations or Group VI or VIII metals, oxides or sulfides. In fact they can be used in combination with any other catalytic components in any systems where the use of a combination of aluminosilicate and refractory oxide is desired. A great variety of such compositions and methods or producing them are well known and need not be elaborated upon. Thus, depending upon the properties desired, the catalyst can contain a catalytically active amount of a metallic element, cation, oxide or sulfide of a nonalkali metal.

The resulting combinations can be used as adsorbents, ion exchange agents, or catalysts, or the like. They are particularly useful as catalysts for acid catalyzed or hydrogenative reactions such as catalytic cracking, hydrocracking, isomerization, dealkylation, hydrogenation, denitrogenation, desulfurization, and the like. Acid catalyzed reactions can be promoted at temperatures as low as 400°F although higher temperatures on the order of 500 to 1000°F are common. Pressures as low as atmospheric or above can be used for catalytic cracking or isomerization. However, higher levels of 500 to 3000 are common for hydrogenative reactions such as hydrocracking, hydrogenation, and denitrogenation. Hydrogen addition rates usually correspond to at least 400 and commonly between 1000 and 15,000 standard cubic feet of hydrocarbon feed. Feeds useful in these processes are well known and include a variety of compositions. Isomerization feeds can boil as low as 100°F while catalytic and hydrocracking feeds usually boil above 400°F.

The aluminosilicate employed in the following examples was an ammonium exchanged sodium Y zeolite having a weight average particle size range of 0.1 to 3 microns. The zeolite was prepared by exchanging sodium zeolite Y having an $SiO_2/Al_2O_3$ mole ratio of 4.6 with ammonium nitrate solution, water washing to remove soluble salts and drying for 16 hours at 212°F. The resultant aluminosilicate contained 0.88 weight percent sodium determined as sodium oxide. The refractory oxide gel was prepared by precipitating alumina from aluminum sulfate in the presence of a precipitated silica gel. The silica gel was prepared by the addition of a sodium silicate solution to sulfuric acid.

Sufficient aluminum sulfate was added to provide an alumina content of 10 weight percent in the oxide. The mixture was neutralized with excess ammonium hydroxide, washed sulfate free and pressed out into a firm filter cake containing 8.7 weight percent solids.

Example 1

An 882 gram portion of the wet oxide gel was dispersed in 440 ml of water to form a stirrable liquid. A 52 gram portion of the ammonium zeolite Y powder was then added with agitation. The sieve powder coagulated into agglomerates of about 0.2 to about 1 mm diameter and could not be dispersed even with severe agitation.

Example 2

A slurry of the silica-alumina cogel and zeolite similar to that described in Example 1 was prepared and combined with an amount of palladium nitrate solution equivalent to 0.5 weight percent palladium based on total dry weight. Hydrogen sulfide gas was then bubbled through the slurry to form palladium sulfide. The solids were collected by filtration and dried 16 hours at 180°F. This material had a "salt and pepper" appearance indicating the presence of separate aggregates.

Example 3

A composition similar to that of Example 2 was prepared by the following procedure. A 40 gram portion of the zeolite powder was dispersed in 250 ml of water. A good dispersion of discreet zeolite particles was obtained. This dispersion was then combined with 588 grams of the silica-alumina cogel containing about 0.5 weight percent palladium as the sulfide. Agglomeration of the zeolite particles proceeded almost immediately, resulting ultimately in the formation of a separate solid phase of zeolite agglomerates which settled to the bottom of the vessel. Thus the refractory oxide gel actually promoted agglomeration of the aluminosilicate particles.

Example 4

One gram portions of the ammonium zeolite powder were added to two agitated vessels containing 20 ml of water. One of the samples contained 1.0 weight percent morpholine. Both of these mixtures were shaken for 30 minutes in 14 cm sedimentation tubes and then allowed to stand 16 hours in the absence of agitation. The aqueous suspension containing no morpholine completely separated leaving a clear supernatant aqueous phase. The morpholine containing solution remained as a cloudy suspension of zeolite particles even after standing for 16 hours.

Example 5

The dispersing effect of the oxyamine was even more apparent when the amine was combined with the aluminosilicate prior to dispersion in the aqueous media. In this example 2 ml of morpholine was mulled with 1 gram of the zeolite powder for 5 minutes with a mortar and pestle. This mixture was then stirred into 30 ml of water and placed in a sedimentation tube. The morpholine treated zeolite suspension was compared to an identical preparation without morpholine. Both of these dispersions were allowed to stand for 48 hours. The morpholine containing suspension remained opaque. In contrast, more than 50 volume percent of the aqueous phase of the parallel preparation separated into a clear supernatant phase.

Example 6

A 20 gram portion of the hydrous silica-alumina cogel was dispersed in 40 ml of water to form a uniform liquid phase. One gram of the ammonium zeolite was mulled with 2 ml of morpholine and was then mixed with one-half of the liquefied gel. The remaining half of the liquefied gel was mixed with a sample of the same zeolite which has been mulled only with water. Both mixtures were then agitated to disperse the several constituents and centrifuged for 10 minutes at 3800 RPM. The cogel and zeolite in the morpholine suspension separated together as a single layer without any indication of heterogeneity. The mixture prepared in the absence of morpholine precipitated as three distinct layers. Larger zeolite aggregates collected at the bottom, a predominately silica-alumina cogel phase formed in the center, and a settled suspension of fine zeolite particles formed at the top.

Example 7

The effectiveness of monoethanolamine was contrasted with ethanol for preventing the aluminosilicate agglomeration. Two parallel mixtures were formed in which 2 grams of the ammonium zeolite were mulled with 5 ml of monoethanol amine and ethanol, respectively. The resulting slurries were added dropwise to the surface of 25 ml of still water without agitation. Agglomerated particles rapidly separated from the ethanol slurry and settled to the bottom of the water phase. However, the zeolite particles in the amine containing slurry did not agglomerate and spread very slowly throughout the liquid as an opaque plume of fine suspended particles.

I claim:

1. The method of forming an intimate mixture of a particulate crystalline, zeolitic aluminosilicate and an amorphous refractory oxide including the steps of mixing said aluminosilicate with said refractory oxide in the presence of water and a deflocculating amount of a water soluble oxygen-containing amine having 1 to about 4 oxygen atoms, 1 to about 3 amino groups, and 2 to about 12 carbon atoms per molecule.

2. The method of claim 1 wherein said aluminosilicate has a weight average particle size less than about 100 microns and constitutes at least about 2 weight percent of the resultant admixture of said aluminosilicate and said refractory oxide, said refractory oxide comprises silica, alumina, magnesia or zirconia and constitutes at least about 10 weight percent of said mixture, said aluminosilicate and refractory oxide are mixed in the presence of at least about 50 weight percent water based on the total weight of said water, aluminosilicate and oxide, and the resultant dispersion of said aluminosilicate and oxide is separated from the resultant aqueous phase and dried.

3. The method of claim 2 wherein said aluminosilicate is a Y zeolite containing less than about 3 weight-percent alkali metal determined as the oxide, and said oxygen-containing amine is selected from alkoxy, alkenoxy and hydroxy alkyl and alkenyl amines, pyridines and piperidines and alkyl, alkenyl, alkoxy, alkenoxy, and hydroxy substituted and unsubstituted oxazines and morpholines.

4. The method of claim 1 wherein said aluminosilicate has a weight average particle size within the range of about 0.1 to about 10 microns and constitutes at least about 5 weight percent of said mixture, said oxide comprises at least one of silica and alumina and constitutes at least about 15 weight percent of said combination, said aluminosilicate and said oxide are admixed in at least about 50 weight percent water based on the total weight of said water, aluminosilicate and oxide in the presence of at least about 0.1 weight percent of said oxygen-containing amine selected from alkoxy, alkenoxy and hydroxy alkyl and alkenyl amines, pyridines and piperidines, and alkyl, alkenyl, alkoxy, alkenoxy, and hydroxy substituted and unsubstituted oxazines and morpholines.

5. The method of claim 2 wherein said aluminosilicate contains less than about 3 weight percent alkali metal determined as the corresponding oxide, and said refractory oxide is a siliceous hydrous gel or sol containing at least about 20 percent silica on a dry weight basis.

6. The stable aqueous dispersion of said aluminosilicate and said refractory oxide prepared by the method of claim 1.

7. The method of claim 5 wherein said refractory oxide comprises at least about 50 weight percent silica and said mixture of said aluminosilicate, refractory oxide, and water contains about 0.5 to about 20 weight percent of said oxygen containing amine.

8. The method of claim 1 wherein said oxygen containing amine is combined with said aluminosilicate prior to admixture of said aluminosilicate and said refractory oxide, said aluminosilicate comprises synthetic faujasite and said oxide comprises at least about 50 weight percent silica.

9. The method of claim 3 wherein said aluminosilicate contains less than about 20 weight percent water prior to combination with said refractory oxide and said refractory oxide comprises at least about 20 weight percent silica and is combined with said aluminosilicate in the form of a hydrous gel or sol containing at least about 20 weight percent water.

10. The stable aqueous dispersion formed by the method of claim 9.

11. The method of claim 1 further comprising the steps of combining with said aluminosilicate or said refractory oxide a catalytically active amount of a non-alkali metal oxide or sulfide or precursor thereof.

12. The composition prepared by the method of claim 2.

13. The composition prepared by the method of claim 9.

* * * * *